US008177986B2

(12) United States Patent
Gullov-Rasmussen

(10) Patent No.: US 8,177,986 B2
(45) Date of Patent: May 15, 2012

(54) METHOD FOR DEODORIZATION

(75) Inventor: Bjarne Gullov-Rasmussen, Virum (DK)

(73) Assignee: ALFA Laval Corporate AB, Lund (SE)

( * ) Notice: Subject to any disclaimer, the term of this patent is extended or adjusted under 35 U.S.C. 154(b) by 854 days.

(21) Appl. No.: 11/912,455

(22) PCT Filed: Apr. 26, 2006

(86) PCT No.: PCT/SE2006/000503
§ 371 (c)(1),
(2), (4) Date: Jul. 18, 2008

(87) PCT Pub. No.: WO2006/118518
PCT Pub. Date: Nov. 9, 2006

(65) Prior Publication Data
US 2008/0305003 A1 Dec. 11, 2008

(30) Foreign Application Priority Data
Apr. 29, 2005 (SE) .................................. 0501009-5

(51) Int. Cl.
*B01D 19/00* (2006.01)
(52) U.S. Cl. ......... 210/767; 96/202; 95/263; 261/114.5; 426/488; 210/188; 210/180
(58) Field of Classification Search ............... 95/264
See application file for complete search history.

(56) References Cited

U.S. PATENT DOCUMENTS

| | | | |
|---|---|---|---|
| 3,511,298 A | 5/1970 | McConnell et al. | |
| 3,693,322 A * | 9/1972 | Lineberry et al. | 95/262 |
| 3,999,966 A * | 12/1976 | Naylor | 96/201 |
| 4,973,430 A * | 11/1990 | Rivers, Jr. | 554/144 |
| 5,030,327 A | 7/1991 | Lee | |
| 6,953,499 B2 * | 10/2005 | Kellens et al. | 96/181 |
| 7,670,634 B2 * | 3/2010 | Kellens et al. | 426/488 |
| 2002/0079598 A1 | 6/2002 | Kedem et al. | |
| 2005/0046051 A1 * | 3/2005 | Sastry | 261/114.1 |
| 2007/0040289 A1 * | 2/2007 | Pilling et al. | 261/114.4 |

OTHER PUBLICATIONS

Y.H. Hui, "Deodorization", Bailey's industrial oil and fat products, 1996, vol. 4, pp. 339-390 pp. 377-378.

* cited by examiner

*Primary Examiner* — Duane Smith
*Assistant Examiner* — Pankti Patel
(74) *Attorney, Agent, or Firm* — Michaud-Kinney Group LLP

(57) ABSTRACT

The present invention relates to a method for deodorising organic fluids or inorganic fluids, which comprises creating a continuous flow or semi continuous flow of the fluids throw a column having one or more trays, creating a plug flow of the fluids through a labyrinth of passages on each tray by regulating the flow through the passages by use of a regulating valve at an exit in the tray, introducing sparging gas on the bottom level of each tray, contacting the fluids with the sparging gas in the plug flow, removing volatiles from the fluids, and transferring the sparging gas and the volatiles in ducts inside the column or outside the column. The present invention relates also to a plug flow tray, a column, a deodorizing plant, and use thereof.

32 Claims, 7 Drawing Sheets

METHOD FOR DEODORIZATION

FIELD OF THE INVENTION

The present invention relates to a method for deodorising organic fluids or inorganic fluids, a plug flow tray, a tray column, a deodorisation column, a plant, and use thereof.

BACKGROUND OF THE INVENTION

Processes for purifying oils and fats comprise columns, which operate more or less in batch wise processes. This might impose differences in the process time for the individual oil molecule resulting in lower quality of the treated oil or fat, since the oil or fat are treated in trays operating by the overflow-drainage principle.

One object of the present invention is to provide a continuous or a semi continuous method for purifying oils and fats having an equal retention time for majority of all molecules in each try of the column.

Another object is to provide tools for accomplishing the method.

SUMMARY OF THE INVENTION

Accordingly the present invention provides a new method for purifying fluids, such as for example all edible oils and fats and mineral oils. The new method can operate continuously, semi continuously or both. The concept of the method is to create a uniform retention time for all molecules or droplets, i.e. all molecules or droplets may flow as a steady flow through the whole tray or the whole column from inlet to outlet, by the principle first in first out. Thus the present invention relates to a method for deodorising high-boiling organic or inorganic fluids, which method comprises creating a continuous flow or semi continuous flow of fluids through a column having one or more trays, creating a plug flow of the fluids through a labyrinth of passages on each tray by regulating the flow through the passages by use of a regulating valve at an exit in the tray, introducing sparging gas on the bottom level of each tray, contacting the fluids with the sparging gas in the plug flow, removing volatiles from the fluids, and transferring the sparging gas and the volatiles in a duct inside the column or outside the column.

The method may also comprise transferring the flow of fluids through the regulating valve to another plug flow tray, or to an economiser heat exchanger. The flow of fluids may be transferred through the regulating valve to the centre of another plug flow tray, to the periphery of another plug flow tray, or through a collecting pipe having the regulating valve at the exit.

The method may also comprise introducing of sparging gas at a bottom level of the trays. According to one alternative embodiment of the method may the sparging gas be introduced at a velocity within a range of from about 20 m/sec to about 40 m/sec. According to a further alternative embodiment of the method may the sparging gas be introduce at a velocity less than about 30 m/sec. The method also comprises that the sparging gas can be selected from water vapour, low molecular fluids, or combinations thereof.

The plug flow of the present method may have a total retention time of less than 60 minutes through the column. According to one alternative embodiment of the method the total retention time may be less than 45 minutes, and according to yet another alternative embodiment of the method the total retention time may be less than 30 minutes. According to a further alternative embodiment of the method the total retention time may be within the range of from about 2 to 30 minutes.

The temperature at which the column can be operating can be less than 280° C. According to one alternative embodiment of the method may the column be operating at a temperature within the range of from about 250° C. to about 270° C.

The pressure at which the column can be operating can be less than 20 mbar. According to one alternative embodiment of the method may the column operate at a pressure can be less than 15 mbar. According to one alternative embodiment of the method may the column operate at a pressure within a range of from about 0.5 to about 10 mbar. According to yet another alternative embodiment of the method may the column operate at a pressure within a range of from about 1.5 to about 5 mbar.

According to the method may the fluids be selected from the group consisting of all edible oils, vegetable oils or fats, animal oils or fats, fish oils, but also mineral oils.

The present invention relates also to a plug flow tray for tray columns, which tray comprises a passage labyrinth of an assembly of baffles connected to the tray bottom and one regulating valve in the tray bottom.

The passage labyrinth may be arranged so that baffle plates are arranged across the flow, and channel plates are arranged along the flow.

The baffles may be connected to the bottom by welding, by brazing, part-welding, part-brazing or combinations thereof, or by any other suitable way of connecting.

The tray layout may comprise an arrangement of baffles mounted in concentric shapes, of spiral shapes, or both, to a tray bottom. Each baffle element may be shaped in such a way that a simple geometry for both baffle and tray can be ascertained, particularly for joining to the assembly of baffles to the bottom. The entire arrangement of baffles may be such, that a continuous passage may be developed in the tray section with the aim of producing as long a passage as can be practically possible.

The tray bottom may be horizontal, sloping towards, or away from the centre, and according to one alternative embodiment may the bottom of the tray be flat, be prismed conical or be circular conical. According to one alternative embodiment may the bottom of the tray be sloping downwards or upward in an angle less than 10°. According to yet another alternative embodiment may the angle be at least 0.5°. According to a further alternative embodiment may the angle be within the range of from about 0.5° to about 5°.

The plug flow tray may also comprise sparging pipes, which are mounted at the bottom level of the tray. According to one alternative embodiment may the sparging pipes have holes, or passages for sparging gas with a diameter within a range of from about 0.5 mm to about 2 mm.

The passage may be continuously directing the fluids towards an exit point at the end, which could be fitted with a flow control device, which may be a regulating valve. The exit point may be in the centre of the tray, at an exit point in the periphery of the tray, or at an exit point at the end of a collecting pipe.

Additionally, one sector in the baffle arrangement could be a void in order to use as a duct for distributing vacuum, or to let out volatile gasses from successive trays mounted below, or both. Accordingly the tray may also comprise at least one duct for vacuum and sparging gas.

The present invention relates also to a tray column, which comprises one or more plug flow trays having a passage labyrinth of an assembly of baffles connected to the tray bottom and one regulating valve at the tray bottom. According to one alternative embodiment can the tray column have less than 10 plug flow trays. According to another alternative embodiment may the tray column have at least one plug flow tray, and according to yet another alternative embodiment may the column have up to six plug flow trays The present invention relates also to a deodorisation column, which comprises at least one tray column, and at least one distilling column or at least one stripper having structured packing material. The distilling column or the stripper may have fluid collectors mounted at the bottom of the distilling column or stripper above the tray column.

According to one alternative embodiment of the invention can the columns be mounted as one vessel containing both the tray column and the distilling column, or can be mounted as two vessels, the tray column and the distilling column connected with a connection pipe. The sparging gas, the vacuum or both can be transported via ducts in the trays, via ducts outside the column, or combinations thereof.

The present invention relates further to a plant comprising the deodorising column, at least one heat exchanger or economiser, and at least one scrubber, the invention relates also to use of the deodorisation plant for purifying all edible oils, vegetable oils or fats, animal oils or fats, fish oils, or mineral oils. Further embodiments of the invention are defined by the claims.

In the following the present invention will be explained in more detail by means of the attached drawings.

DETAILED DESCRIPTION OF THE PREFERRED EMBODIMENTS

Figure 1:
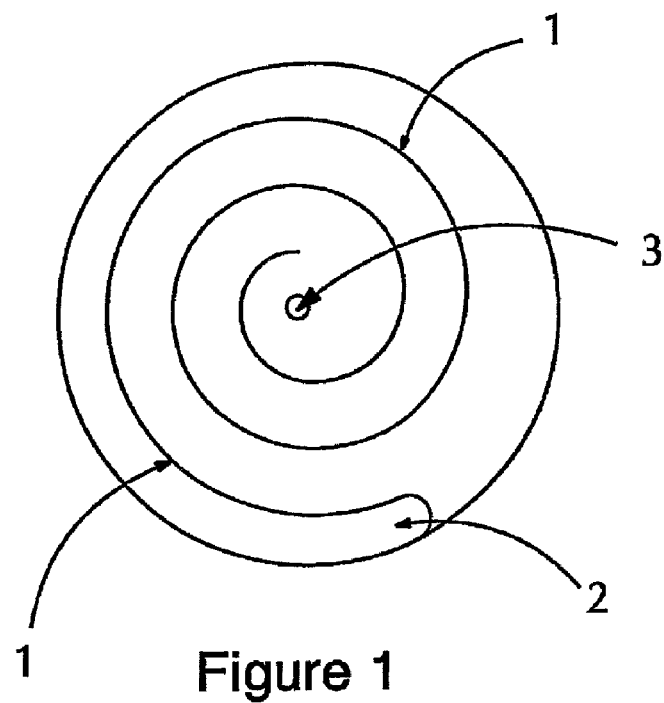
FIG. 1 is showing a cross section of one alternative baffle arrangement according to the invention.
Figure 2:
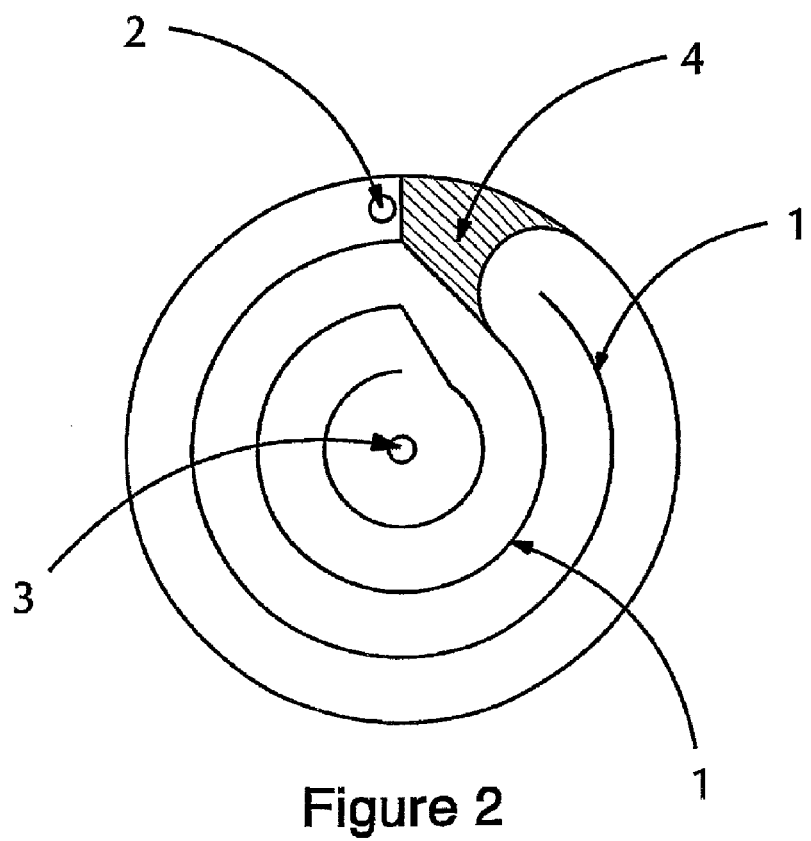
FIG. 2 is showing a cross section of another alternative baffle arrangement according to the invention.
Figure 3:
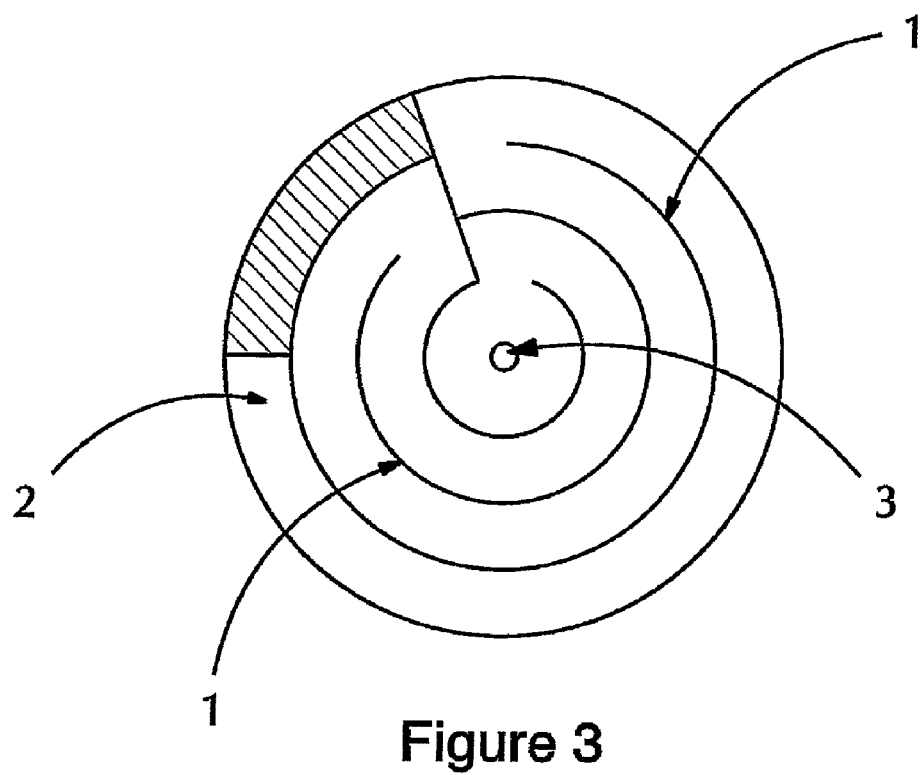
FIG. 3 is showing a cross section of a further alternative baffle arrangement according to the invention.
Figure 4:
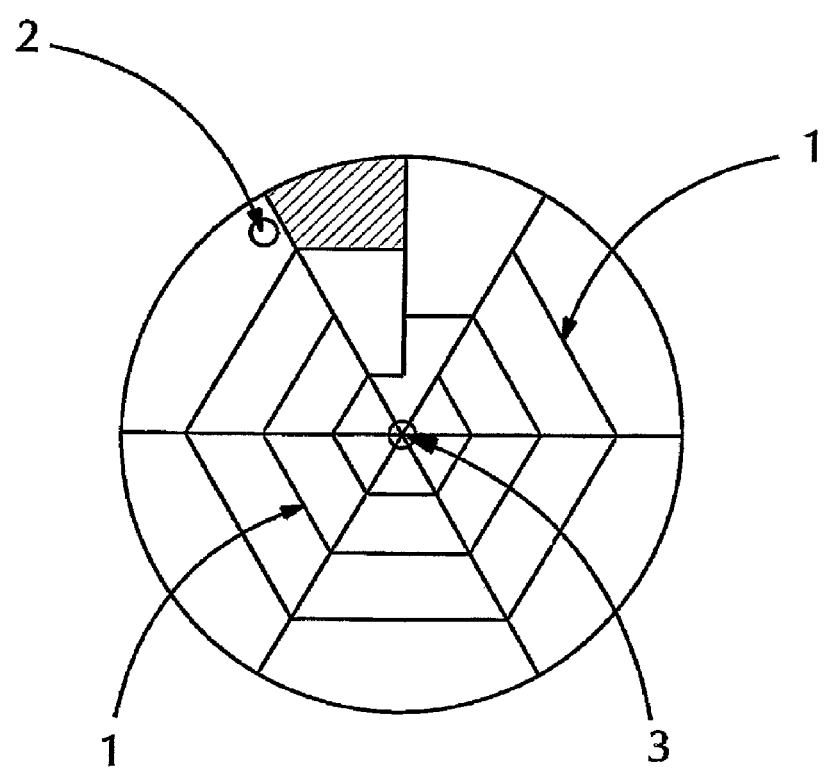
FIG. 4 is showing a cross section of a further alternative baffle arrangement according to the invention.
Figure 5:
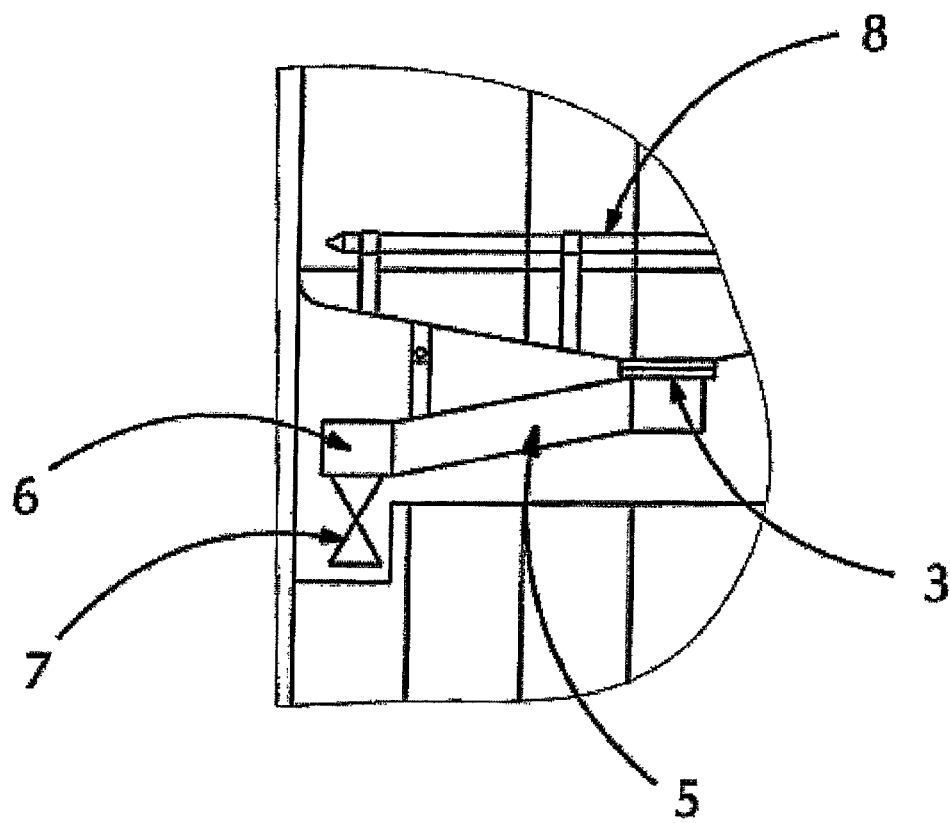
FIG. 5 is showing a cross section of side view of a collecting device having a regulating valve at the exit, according to one alternative embodiment of the invention.

A spiral arrangement of baffles 1 is shown in FIG. 1, forming a spiral labyrinth of passages, in which the fluids flow from an inlet point 2 to an exit point 3. In FIGS. 2, 3 and 4 are other arrangements of a spiral labyrinth of passages disclosed. The fluids are directed through passages to flow for as long time as possible before leaving the tray at exit point 3. A duct 4 for sparging gas and vacuum are shown in the figures. Depending on if the tray bottoms are turned upwards or downwards inlet point 2 and exit point 3 may change place according to alternative embodiments of the invention. In all FIGS. 1 to 4 a regulating valve is mounted at or close to the exit point 3, the regulating valve is not shown in the figures.

The fluids are leaving the trays at an exit point 3 in the tray and are transferred to a collecting device 5 according to one alternative embodiment. The collecting device is sloping sideways in the direction towards the periphery of a tray below and over an inlet point not shown in the figure. At the end point 6 of the collecting device is a regulating valve 7 mounted, which regulates the fluid flow in the passages of the tray above. Sparging pipes 8 are mounted at the bottom of the tray.

Figure 6:
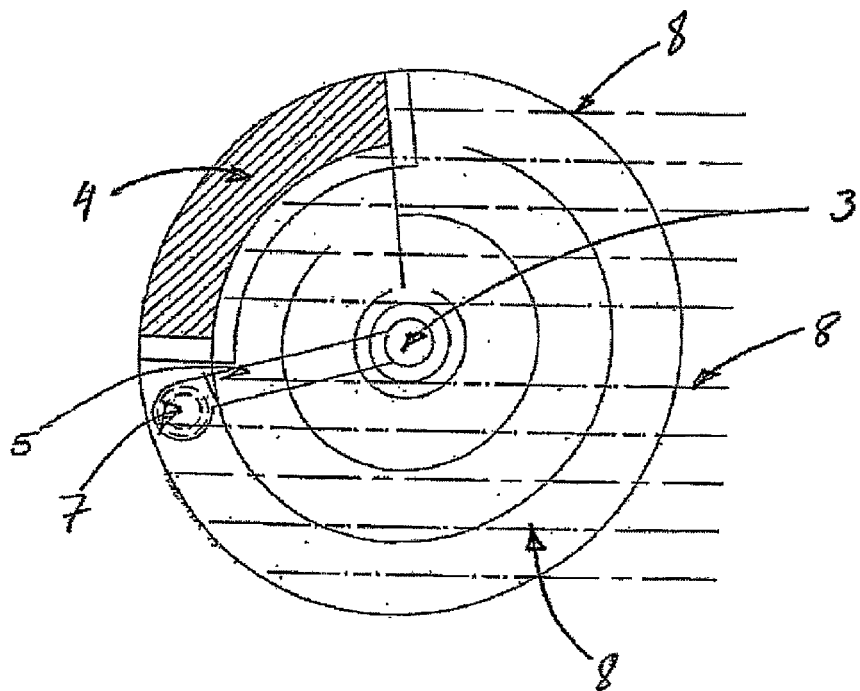
FIG. 6 is showing a cross section of a tray having sparging pipes according to one alternative embodiment.
Figure 7:
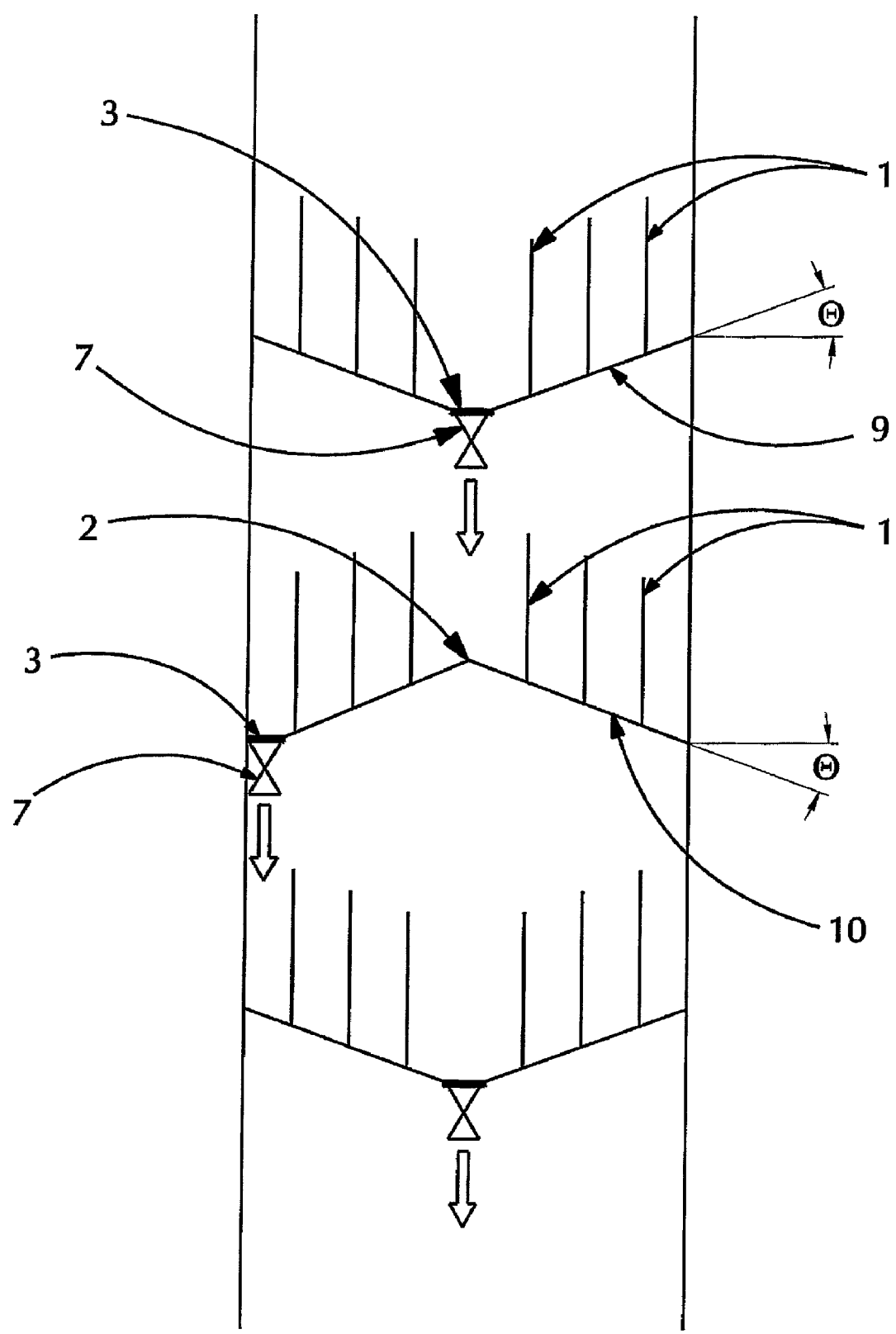
FIG. 7 is showing a cross section of a side view of a tray column according to one alternative embodiment of the invention.

Each tray is equipped with several sparging pipes 8 which can be seen in FIG. 6. FIG. 6 shows also under lying collecting device 5 having regulating valve 7. The bottoms of the plug flow trays in the tray column can be horizontal, turned upwards or downwards. In FIG. 7 are the trays both turned upwards and downwards according to one alternative embodiment. Tray 9 is turned downwards having an angle θ, which can be less than 10°. At the lowest point is an exit point 3 to which a regulating valve 7 is mounted. The flow of fluids will be transferred from the regulating valve mounted in the centre of tray to an inlet point 2 on tray 10. Tray 10 is turned upwards. The flow of fluids will pass the labyrinth of passages from the inlet point in the centre of the tray out to an exit point 3 at the periphery. Mounted to exit point 3 is a regulating valve 7. Also Tray 10 is having an angle θ, which is less than 10°.

Figure 8:
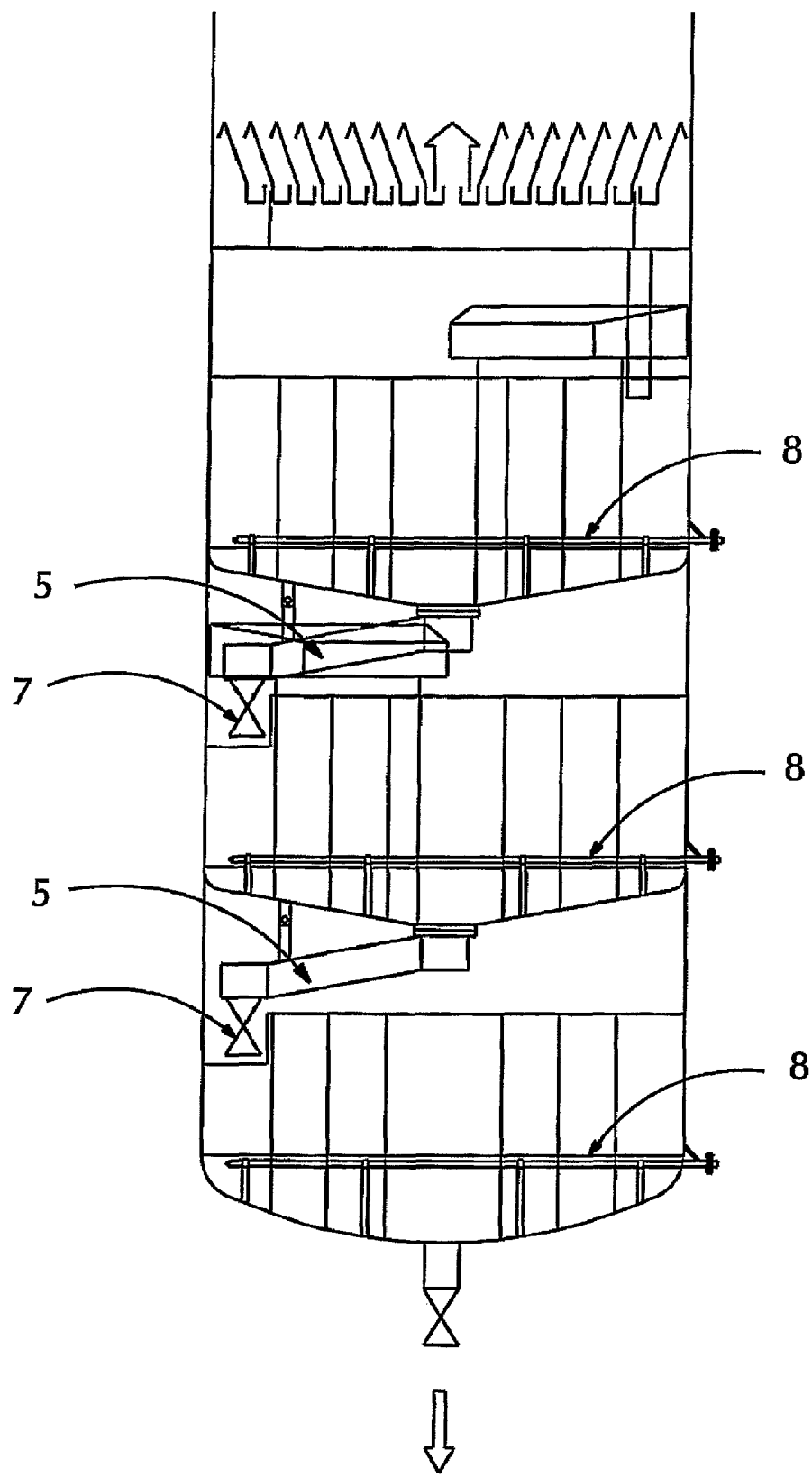
FIG. 8 is showing a cross section of a side view of a tray column according to another alternative embodiment of the invention.
Figure 9:
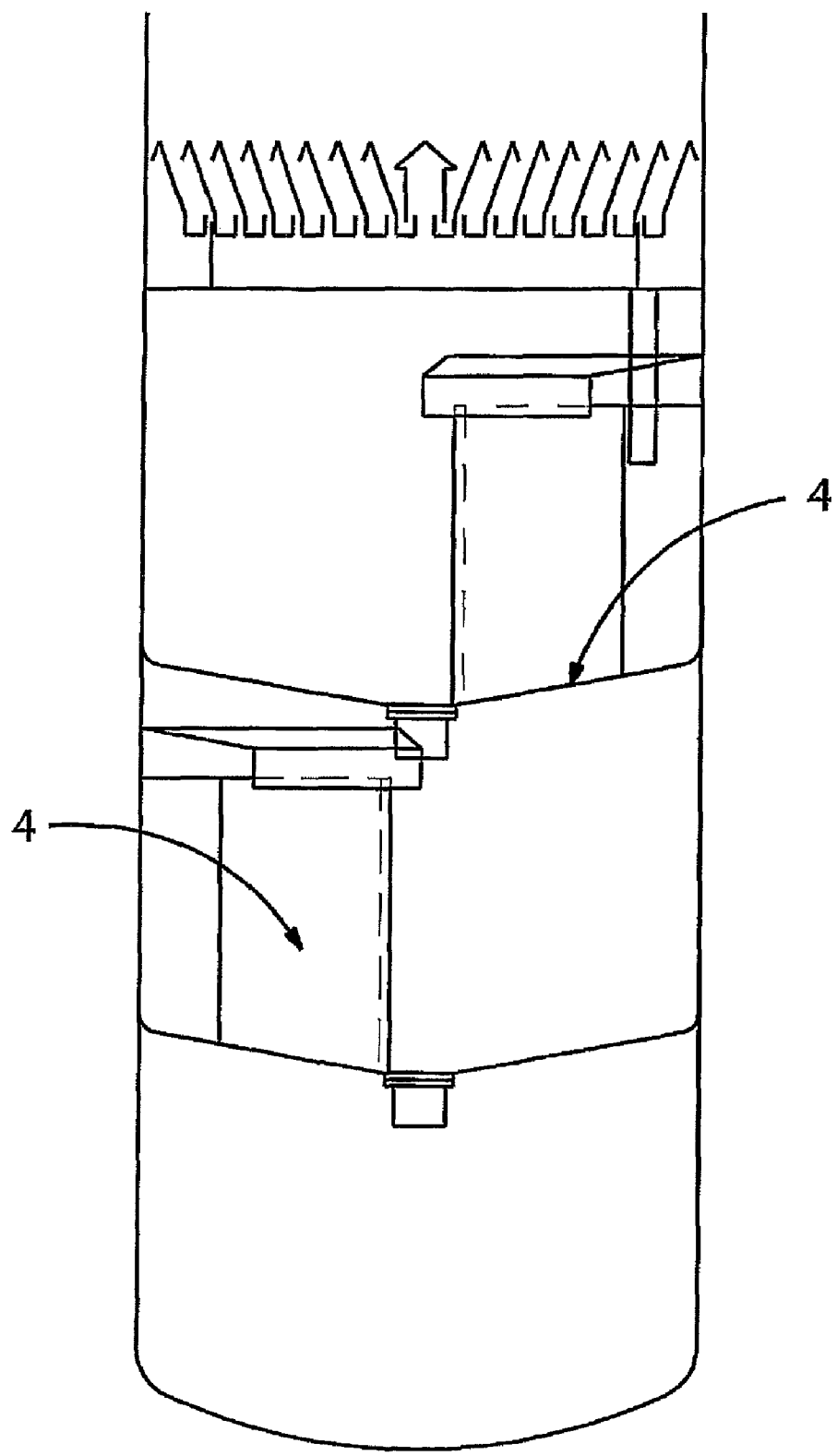
FIG. 9 is showing a cross section of a side view of a tray column showing gas and vacuum ducts inside the column according to one alternative embodiment.
Figure 10:
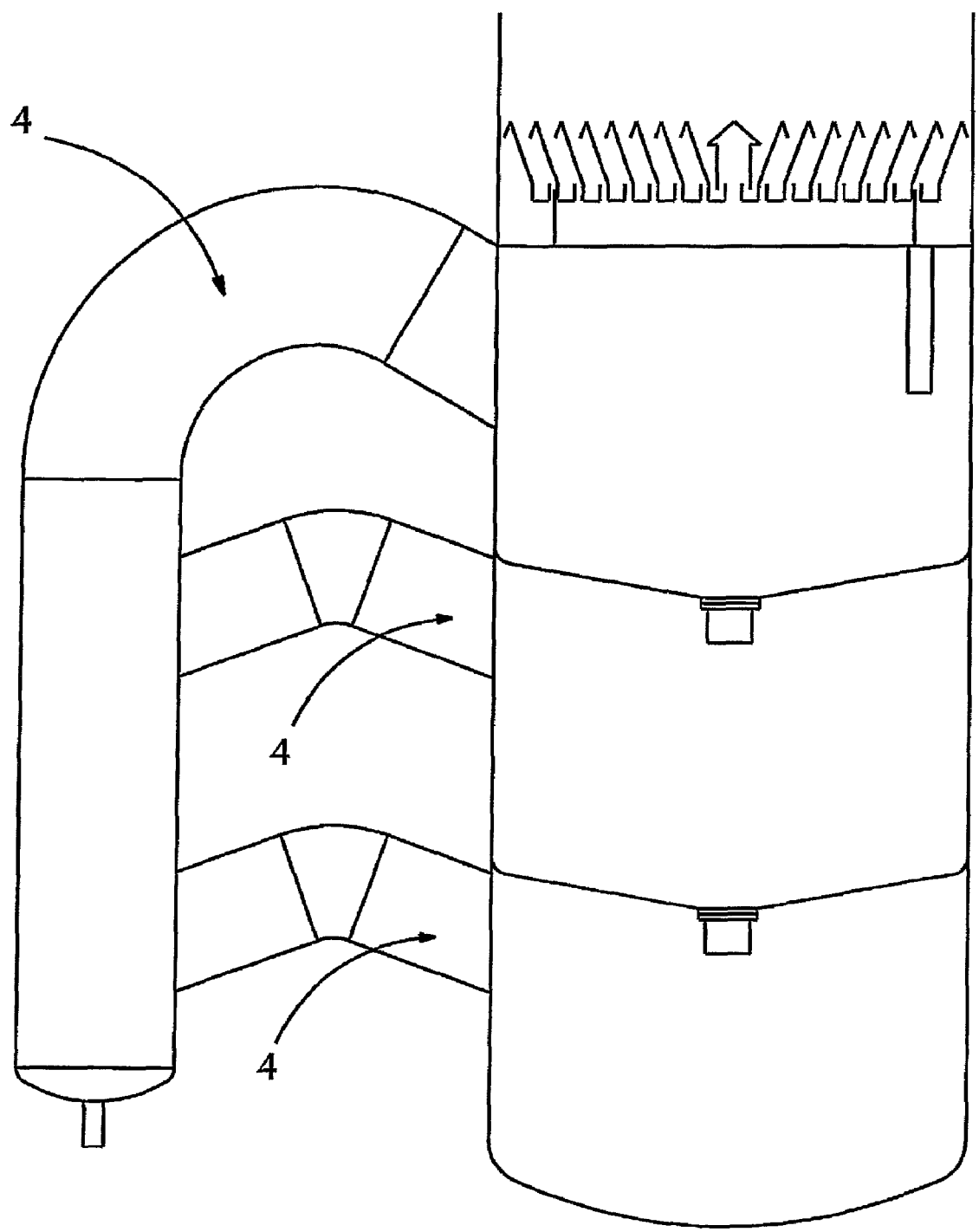
FIG. 10 is showing a cross section of a side view of a tray column showing gas and vacuum ducts outside the column according to another alternative embodiment.

FIG. 8 shows a tray column having only trays sloping downwards. According to this alternative embodiment are the trays equipped with collecting devices 5 and regulating valves 7, which are mounted at the periphery of the column. Ducts 4 for vacuum, volatiles and sparging gas according to one alternative embodiment are mounted inside the tray column, which can be seen in FIG. 9. FIG. 10 is showing another alternative embodiment wherein the ducts 4 are mounted outside the tray column.

What is claimed is:

1. A method for deodorizing organic or inorganic fluids comprising creating a continuous flow or semi continuous flow of the fluids through a column having one or more trays, creating a plug flow of the fluids through a labyrinth of passages on each tray by regulating the flow through the passages by use of a regulating valve at an exit in the tray, introducing sparging gas on the bottom level of each tray, contacting the fluids with the sparging gas in the plug flow, removing volatiles from the fluids, and transferring the sparging gas and the volatiles in a duct inside the column or outside the column.

2. The method according to claim 1, wherein the method also comprises transferring the flow of fluids through the regulating valve to another plug flow tray, or to an economiser heat exchanger.

3. The method according to claim 1, wherein the method also comprises transferring the flow of fluids through the regulating valve to the centre of another plug flow tray, to the periphery of another plug flow tray, or through a collecting pipe having the regulating valve at the exit.

4. The method according to claim 1, wherein the method also comprises introducing of sparging gas at a bottom level of the trays.

5. The method according to claim 1, wherein the sparging gas being introduced at a velocity within a range of from about 20 m/sec to about 40 m/sec.

6. The method according to claim 1, wherein the sparging gas being introduce at a velocity less than about 30 m/sec.

7. The method according to claim 1, wherein the sparging gas being selected from water vapour, low molecular fluids, or combinations thereof.

8. The method according to claim 1, wherein the plug flow having a total retention time less than 60 minutes.

9. The method according to claim 1, wherein the plug flow having a total retention time within the range of from about 2 to 30 minutes.

10. The method according to claim 1, wherein the column operates at a temperature less than 280° C.

11. The method according to claim 1, wherein the column operates at a temperature within the range of from about 250° C. to about 270° C.

12. The method according to claim 1, wherein the column operates at a pressure less than 20 mbar.

13. The method according to claim 1, wherein the column operates at a pressure within a range of from about 1.5 to about 5 mbar.

14. The method according to claim 1, wherein the fluids being selected from the group consisting of all edible oils, vegetable fats or oils, animal fats or oils, fish oils, and mineral oils.

15. A plug flow tray for tray columns comprising a passage labyrinth of an assembly of baffles mounted to the tray bottom and one regulating valve in the tray bottom.

16. The plug flow tray according to claim 15, wherein the tray also comprises sparging pipes mounted at the bottom level of the tray.

17. The plug flow tray according to claim 15, wherein the sparging pipes having holes, or passages for sparging gas with a diameter within a range of from about 0.5 mm to about 2 mm.

18. The plug flow tray according to claim 15, wherein the tray also comprises at least one duct for vacuum and sparging gas.

19. The plug flow tray according to claim 15, wherein the assembly of baffles are mounted in concentric shapes, of spiral shapes, or both to the tray bottom.

20. The plug flow tray according to claim 15, wherein the regulating valve being mounted at an exit point in the centre of the tray, at an exit point in the periphery of the tray, or at an exit point at the end of a collecting pipe.

21. The plug flow tray according to claim 15, wherein the tray bottom being flat bottom, prismed conical bottom or circular conical bottom.

22. The plug flow tray according to claim 15, wherein the bottom of the tray being sloping downwards or upward in an angle less than 100.

23. The plug flow tray according to claim 22, wherein the angle being at least 0.5°.

24. The plug flow tray according to claim 22, wherein the angle being within the range of from about 0.5° to about 5°.

25. A tray column comprising one or more plug flow trays according to claim 15.

26. The tray column according to claim 25, wherein there are less than 10 plug flow trays in the column.

27. The tray column according to claim 26, wherein there is at least one plug flow tray.

28. A deodorization column comprising at least one tray column according to claim 25, and at least one distilling column having structured packing material.

29. The deodorization column according to claim 28, wherein at the bottom of the distilling column fluid collectors are mounted.

30. The deodorization column according to claim 28, wherein the tray column and the distilling column are mounted as one vessel, or are mounted as two vessels connected with a connection pipe, or combinations thereof.

31. The deodorization column according to claim 28, wherein the sparging gas, the vacuum or both are transported via ducts in the trays, via ducts outside the column, or combinations thereof.

32. A plant comprising a deodorization column according to claim 28, at least one heat exchanger or at least one heat exchanger economiser, or combinations thereof, and at least one scrubber.

* * * * *